(12) United States Patent
Hashida et al.

(10) Patent No.: US 7,071,843 B2
(45) Date of Patent: Jul. 4, 2006

(54) NAVIGATION SYSTEM AND NAVIGATION EQUIPMENT

(75) Inventors: Masaya Hashida, Saitama-ken (JP); Toshiki Matsukawa, Saitama-ken (JP); Mayumi Naganuma, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/421,856

(22) Filed: Apr. 24, 2003

(65) Prior Publication Data

US 2003/0201912 A1    Oct. 30, 2003

(30) Foreign Application Priority Data

Apr. 26, 2002   (JP)   ............... 2002-126940

(51) Int. Cl.
*G08G 1/123*   (2006.01)
(52) U.S. Cl. .................. 340/995.12; 340/995.1; 340/995.22; 701/208
(58) Field of Classification Search ........... 340/995.12, 340/995.22, 995.19, 995.21, 995.23, 995.1, 340/990, 988; 701/208, 209, 211, 213
See application file for complete search history.

(56) References Cited

U.S. PATENT DOCUMENTS

| | | | | |
|---|---|---|---|---|
| 6,107,944 | A |  8/2000 | Behr et al. ................. | 340/988 |
| 6,178,377 | B1* | 1/2001 | Ishihara et al. ............. | 701/200 |
| 6,249,740 | B1 | 6/2001 | Ito et al. ..................... | 701/200 |
| 6,338,020 | B1* | 1/2002 | Hashimoto .................. | 701/208 |
| 6,567,746 | B1* | 5/2003 | Kuroda et al. ............... | 701/212 |
| 6,754,485 | B1* | 6/2004 | Obradovich et al. ...... | 455/414.1 |
| 2002/0040271 | A1 | 4/2002 | Park et al. ................... | 701/209 |

FOREIGN PATENT DOCUMENTS

| | | |
|---|---|---|
| EP | 1 102 036 A1 | 5/2001 |
| EP | 1 241 651 A1 | 9/2002 |

OTHER PUBLICATIONS

European Search Report dated Jun. 4, 2003.

* cited by examiner

*Primary Examiner*—Brent A. Swarthout
(74) *Attorney, Agent, or Firm*—McGinn IP Law Group, PLLC (57) ABSTRACT

A navigation system and navigation equipment which reduce the time required for radio transmissions to implement fast navigational guidance. The navigation equipment communicates bi-directionally by radio with a navigation server, thereby providing navigational guidance. The navigation equipment transmits position data delivered by a GPS receiver to the navigation server through a communication device and acquires, from the communication device, map data for display indicative of a map of a surrounding area including a self-location provided by the position data sent back from the navigation server. The navigation equipment then performs map matching between road information contained in the acquired map data for display and the position information, thereby determining a current position on the road, thereby displaying a map in the form of an image on a display unit in accordance with the map data for display and displaying the current position determined by the map matching on the map displayed in the form of an image.

13 Claims, 6 Drawing Sheets

PRIOR ART

NAVIGATION SYSTEM AND NAVIGATION EQUIPMENT

BACKGROUND OF THE INVENTION

The present invention relates to a navigation system and navigation equipment which present the location of a mobile unit or the like using map information which is provided over a communication network such as the Internet.

The present application claims priority from Japanese Application No. 2002-126940, the disclosure of which is incorporated herein by reference.

Figure 6:
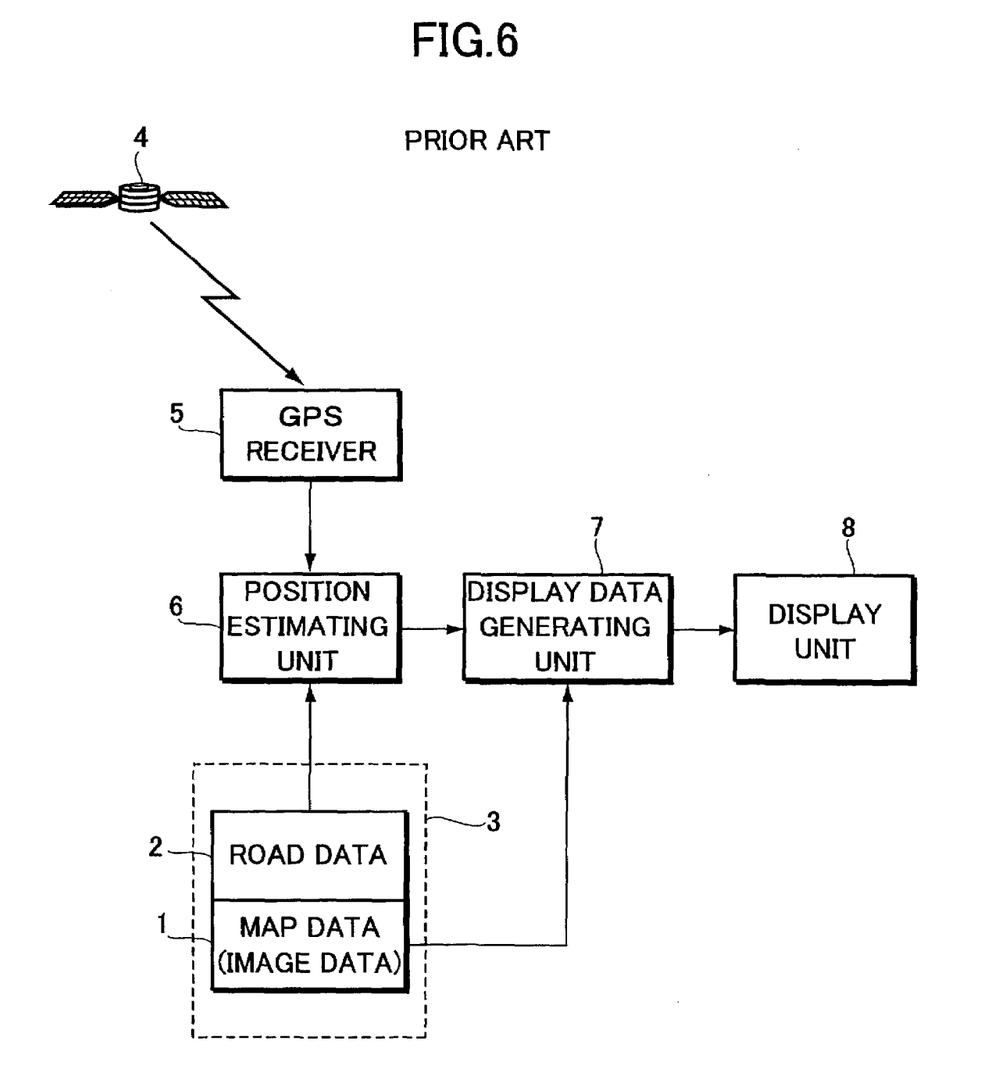
FIG. 6 is a block diagram illustrating the configuration of conventional navigation equipment.

For example, in the field of the navigation technology for presenting the location of a mobile unit or the like, a conventional vehicle navigation equipment configured as shown in FIG. 6 has been used to provide the location of a traveling vehicle to a driver or a passenger in a vehicle.

That is, the conventional navigation equipment includes an information read unit 3 for reading information from a large capacity information storage medium such as a CD (Compact Disc) or a DVD (Digital Versatile Disc) on which stored are map data 1 to be displayed and road data 2 containing detailed information on many roads and intersections corresponding to the map data 1.

When a user such as the driver of a vehicle loads a DVD or the like into the information read unit 3 to issue a command to start navigational guidance, a GPS receiver 5 receives radio transmissions from a GPS (Global Positioning System) satellite 4 to determine a self-location of the vehicle. A position estimate unit 6 performs map matching between the location data indicating the self-location and the road data 2, there by estimating the accurate current position associated with reception errors or the like corrected. A display data generating unit 7 combines the resulting estimate with the map data 1, and the combined information is supplied to a display unit 8. In this manner, the current position of the vehicle is displayed in the form of a map.

The map data 1 is formed of image data which can visually be displayed in the same manner as maps of sheet type found in a so-called commercially available atlas.

On the other hand, the road data 2 is formed of a larger quantity of data than the map data 1. This is because the road data 2 is not intended merely for a visible representation of a map but also contains a large quantity of detailed data with regard to the orientation and distance of all the roads and the locations (latitudes and longitudes) and shapes of all intersections (e.g., the shapes of intersections with traffic signals or overpass crossings), which are contained in the map.

It has been a common practice to update such a large quantity of road data 2 and map data 1, for example, every time a new road is constructed, and store the updated information on a DVD or the like, which is then distributed to users, thereby providing an up-to-date navigational environment to the users.

However, the latest information provided in a DVD or the like is insufficient for dynamic navigational guidance. Accordingly, attempts have been made to provide the latest navigational environment as soon as possible by distributing the latest map information (i.e., map data and road data) over communication networks such as the Internet to the navigation equipment possessed by the users.

A so-called client-server system has also been suggested which not only distributes the latest map information but also receives the location data determined by a GPS determination from the traveling vehicle and then provides the user with the real-time map information (map data and road data) relating to the surroundings of the vehicle to display the current position of the user on a map at the user's navigation equipment.

However, as described above, the distribution of map information over a communication network such as the Internet would require the transmission of a large quantity of map data and road data to the user's navigation equipment. This has raised problems that a long transmission time is required, there by making it difficult to provide fast response sufficient for dynamic navigational guidance, and the user is burdened with an increase in costs for transmissions.

SUMMARY OF THE INVENTION

The present invention has been developed in view of the foregoing problems. It is therefore an object of the present invention to provide a navigation system and navigation equipment which can utilize communication networks to implement a fast navigational environment.

According to a first aspect of the invention, there is provided a navigation system including a mobile unit and a navigation server communicating with each other over a radio communication network. In particular, the mobile unit comprises communicating means for communicating bi-directionally with the navigation server over the radio communication network; positioning means for determining a self-location of the mobile unit; control means for transmitting position information delivered by the positioning means to the navigation server through the communicating means, and for acquiring, from the communicating means, map information for display indicative of a map of a surrounding area including the self-location provided by the position information sent back from the navigation server, to perform map matching between road-related information contained in the acquired map information for display and position information determined by the positioning means, thereby determining a current position of the mobile unit on the road; and display means for displaying a map in the form of an image in accordance with the map information for display and for displaying the current position determined by the control means on the map displayed in the form of an image. Specifically, when having received the position information transmitted from the mobile unit, the navigation server sends map information for display, corresponding to the map of the surrounding area including the self-location of the mobile unit determined by the received position information, back to the mobile unit.

According to a second aspect of the invention, when having received the position information indicative of the self-location transmitted from the mobile unit and information with regard to a destination, the navigation server searches for an optimal route from the self-location to the destination and sends route information formed of only road information with regard to a road constituting the optimal route back to the mobile unit. Further, instead of performing map matching between the road information contained in the map information for display and position information determined by the positioning means, the control means performs map matching between the route information sent back from the navigation server and the position information determined by the positioning means, thereby determining a current position to be displayed on the display means.

According to a third aspect of the invention, when having determined that the route information sent back from the navigation server and the position information determined by the positioning means do not satisfy a predetermined condition, the control means performs map matching between the road information contained in the map information for display and the position information determined by the positioning means, thereby determining a current position to be displayed on the display means.

According to a fourth aspect of the invention, there is provided navigation equipment comprising communicating means for communicating bi-directionally with a navigation server over a radio communication network; positioning means for determining a self-location; control means for transmitting position information delivered by the positioning means to the navigation server through the communicating means, and for acquiring, from the communicating means, map information for display indicative of a map of a surrounding area including the self-location provided by the position information sent back from the navigation server, to perform map matching between road information contained in the acquired map information for display and the position information determined by the positioning means, thereby determining a current position of a mobile unit on the road; and display means for displaying a map in the form of an image in accordance with the map information for display and for displaying the current position determined by the control means on the map displayed in the form of an image.

According to a fifth aspect of the invention, the control means transmits the position information delivered by the positioning means and information with regard to a destination to the navigation server, and acquires route information indicative of an optimal route and formed of only road information with regard to a road to the destination from the self-location provided by the position information sent back from the navigation server, to perform map matching between the route information sent back from the navigation server and the position information determined by the positioning means, instead of performing map matching between the road information contained in the map information for display and the position information determined by the positioning means, thereby determining a current position to be displayed on the display means.

According to a sixth aspect of the invention, when having determined that the route information sent back from the navigation server and the position information determined by the positioning means do not satisfy a predetermined condition, the control means performs map matching between the road information contained in the map information for display and the position information determined by the positioning means, thereby determining a current position to be displayed on the display means.

According to the navigation system of the first aspect and the navigation equipment of the fourth aspect of the invention, the navigation server sends back the map information for display indicative of the map of the surrounding area including the self-location of the mobile unit or the navigation equipment in response to a request from the mobile unit or the navigation equipment. The mobile unit or the navigation equipment performs map matching between the road information included in the map information for display and the position information with regard to the self-location, thereby determining a current position on the road and displaying the current position on the map displayed in the form of an image in accordance with the map information for display.

Map information for display having a small amount of data is transmitted by radio as described above to reduce the time required for communication, thereby providing high-speed navigational guidance and reduced communication costs.

According to the navigation system of the second aspect and the navigation equipment of the fifth aspect of the invention, the navigation server determines an optimal route from the self-location of the mobile unit or the navigation equipment to a destination in response to a request from the mobile unit or the navigation equipment and then sends back the route information indicative of the optimal route and formed of only road information with regard to the road constituting the optimal route to the mobile unit or the navigation equipment. The mobile unit or the navigation equipment performs map matching between the route information and the position information indicative of the self-location, thereby determining a current position on the optimal route and displaying the current position on the map displayed in the form of an image in accordance with the map information for display.

Route information having a small amount of data and formed of only road information relating to a road constituting the optimal route is transmitted by radio as described above to reduce the time required for communication, thereby providing high-speed navigational guidance and reduced communication costs.

According to the navigation system of the third aspect and the navigation equipment of the sixth aspect of the invention, when the route information sent back from the navigation server and the position information indicative of the self-location do not satisfy a predetermined condition, the control means performs map matching between the information with regard to the road included in the map information for display and the position information, thereby determining a current position to be displayed on the display means.

That is, when the map matching cannot be performed between the route information and the position information indicative of the self-location, the map matching is performed between the information with regard to the road included in the map information for display and the position information, thereby appropriately determining a current position.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
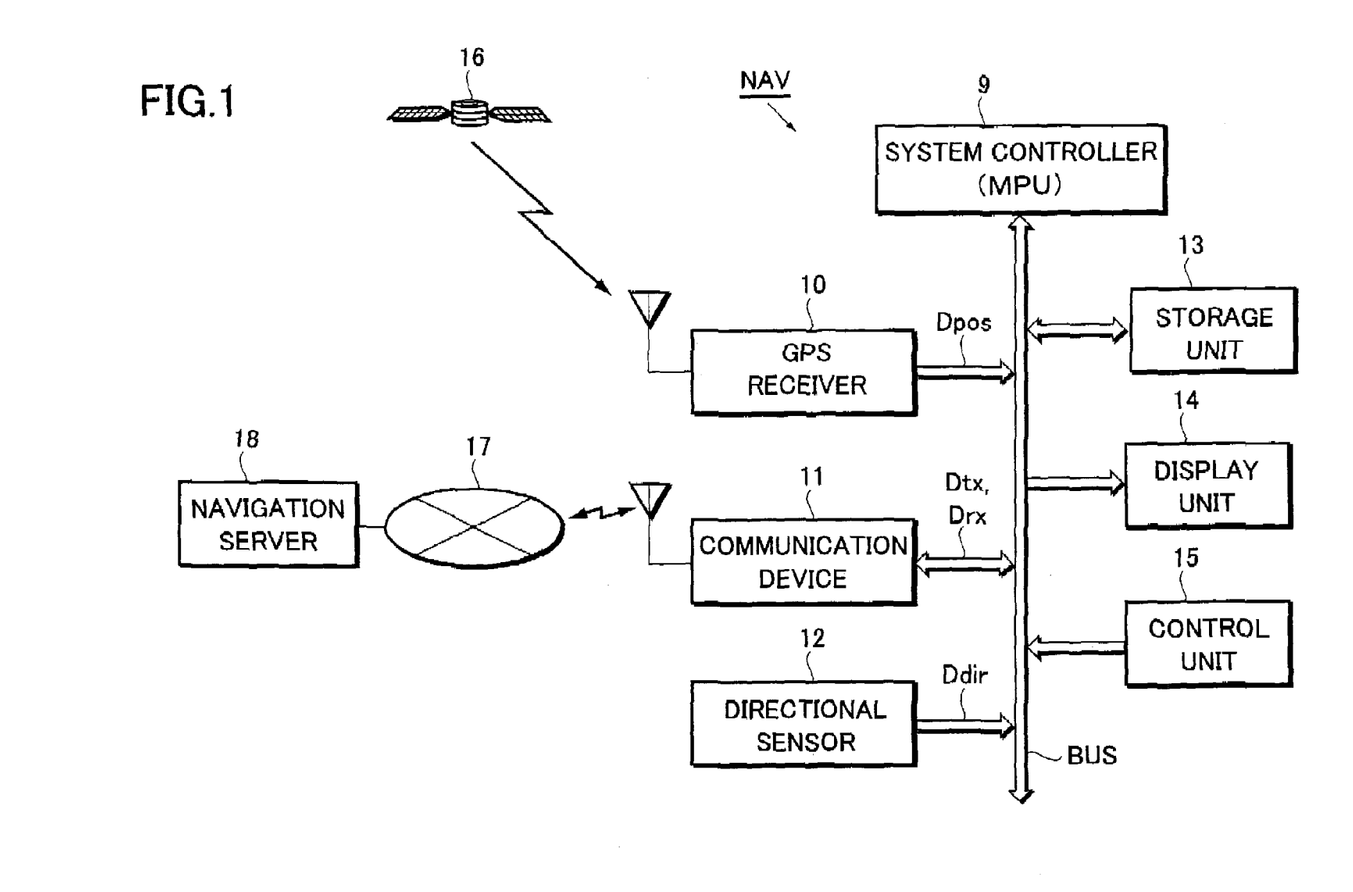
FIG. 1 is a block diagram illustrating the configuration of navigation equipment and a navigation system according to the invention.

Now, the present invention will be described below in more detail with reference to the accompanying drawings in accordance with the embodiment. FIG. 1 is a block diagram illustrating the configuration of vehicle navigation equipment and a navigation system according to one preferred embodiment of the present invention.

For descriptive purposes, it is to be understood that a location currently determined by a GPS receiver 10, discussed later, is referred to as a "self-location" while a current location estimated by map matching is referred to as a "current position."

Referring to FIG. 1, a mobile unit or the navigation equipment NAV has a system controller 9 having a microprocessor (MPU) to serve as control means, the GPS receiver 10, a communication device 11, a directional sensor 12, a storage unit 13, a display unit 14, and a control unit 15, all of which are centrally controlled by the system controller 9.

In other words, the GPS receiver 10, the communication device 11, the directional sensor 12, the storage unit 13, the display unit 14, and the control unit 15 are all connected to a bus (a data bus and a control bus) BUS extending from the aforementioned microprocessor (MPU). The microprocessor (MPU) is adapted to execute a pre-installed system program, thereby centrally providing control to the operation of the entire navigation equipment NAV.

The GPS receiver 10 receives incoming radio transmissions from a GPS satellite 16 to determine the self-location of the navigation equipment NAV or the current position of the vehicle equipped with the navigation equipment NAV, and then sends the determined data or position data Dpos to the system controller 9.

The communication device 11 communicates bi-directionally by radio with a navigation server 18 (which will be discussed later), over a communication network 17 such as the Internet or a mobile communication network. The communication device 11 then acquires, from the navigation server 18, travel routes to the destination desired by the user and map information for displaying the current position of the vehicle. To do this, the communication device 11 transmits transmission data Dtx created in the system controller 9 to the navigation server 18, which in turn receives the transmission data Dtx and then sends data Drx containing the travel routes and map information back to the communication device 11, so that the data Drx is received and supplied by the communication device 11 to the system controller 9.

The directional sensor 12 is formed of a gyroscopic sensor for detecting the direction of travel of the vehicle, and adapted to successively detect the direction of travel of the vehicle (the forward direction of the vehicle) and then supply the detected data or directional data Ddir to the system controller 9.

The storage unit 13 has a read only memory (ROM) for storing the aforementioned system program and a rewritable nonvolatile memory for storing map data Dmap or map information acquired from the navigation server 18 for display and data Droot (hereinafter referred to as the route data) indicative of an optimal travel route to the destination.

As the rewritable nonvolatile memory, the storage unit 13 is to employ a memory such as a Smart Media (trademark), SD memory (trademark), or Compact Flash memory (trademark).

The display unit 14 includes an electroluminescence device having a liquid crystal display or the like, and a video memory (VRAM) for storing image data to be employed to display images on the electroluminescence device.

The control unit 15 includes a plurality of function keys each having predetermined functions and supplies the command provided by the function key pressed by the user to the system controller 9.

As a typical example of the functions of the control unit 15, when the user desires to search a travel route to a desired destination, the user first depresses the predetermined function key provided in the control unit 15 to specify the desired destination. The user then presses the function key indicative of the start of searching for the travel route, thereby causing the control unit 15 to supply the data Dobj (hereinafter referred to as the "destination data") indicative of the destination to the system controller 9.

When the user depresses the predetermined function key to issue a command to start navigational guidance, the navigation equipment NAV initiates the navigational guidance under the control of the system controller 9.

The aforementioned navigation server 18 is provided at a distribution site, located on the Internet or a mobile communication network, for distributing the up-to-date map data, and provided with at least a database for storing map data Dmap which covers all the areas of Japan, large or small, in a variety of scales.

When having received the predetermined transmission data Dtx transmitted from the aforementioned navigation equipment NAV, the navigation server 18 searches the database for the route data Droot or the map data Dmap indicative of the travel route requested by the transmission data Dtx and then sends the searched data to the navigation equipment NAV.

A user possessing the navigation equipment NAV is supposed to sign up for the navigation system with a distribution site carrier. Upon the sign-up, the user can select either the payment on a fixed-rate basis, by which the user can freely use the navigation system for a predetermined period, or the payment on an as-used basis by which the user is charged for each access to the navigation server 18. The user would then be charged for the cost of service provided every time the navigation server 18 sends back the route data Droot or the map data Dmap to the user, and pay for the service according to the selected payment condition.

Furthermore, upon the sign-up, unique identification code data (ID code data) is assigned to each navigation equipment NAV possessed by the user. When the navigation equipment NAV accesses the navigation server 18, the navigation server 18 determines according to the ID code data whether the access has been made by the authorized user.

Now, the operation of the navigation system and the navigation equipment NAV having the aforementioned configuration will be explained below with reference to FIGS. 2 to 5.

Figure 2:
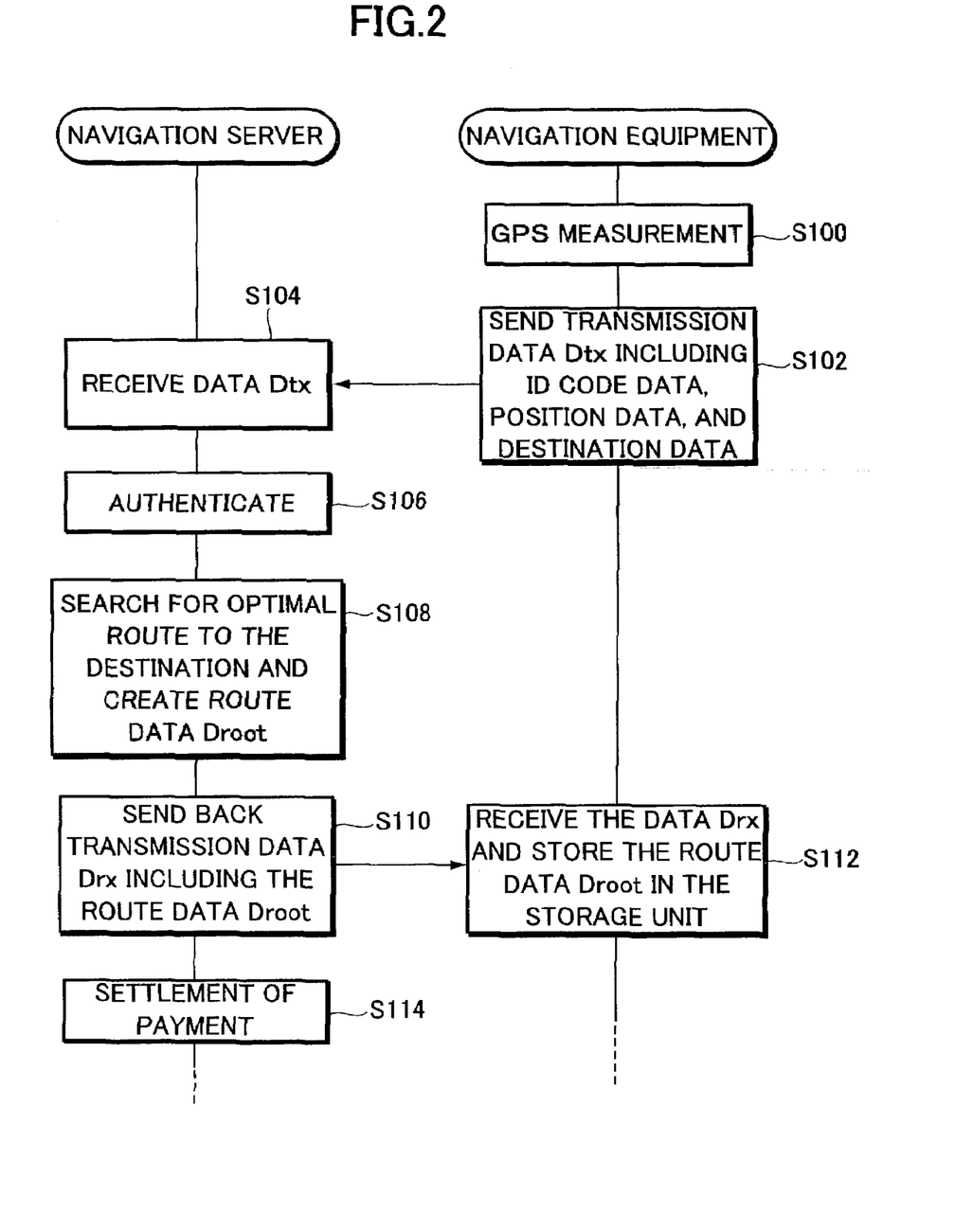
FIG. 2 is a sequence chart showing the operation for searching for an optimal route to a destination.
Figure 3:
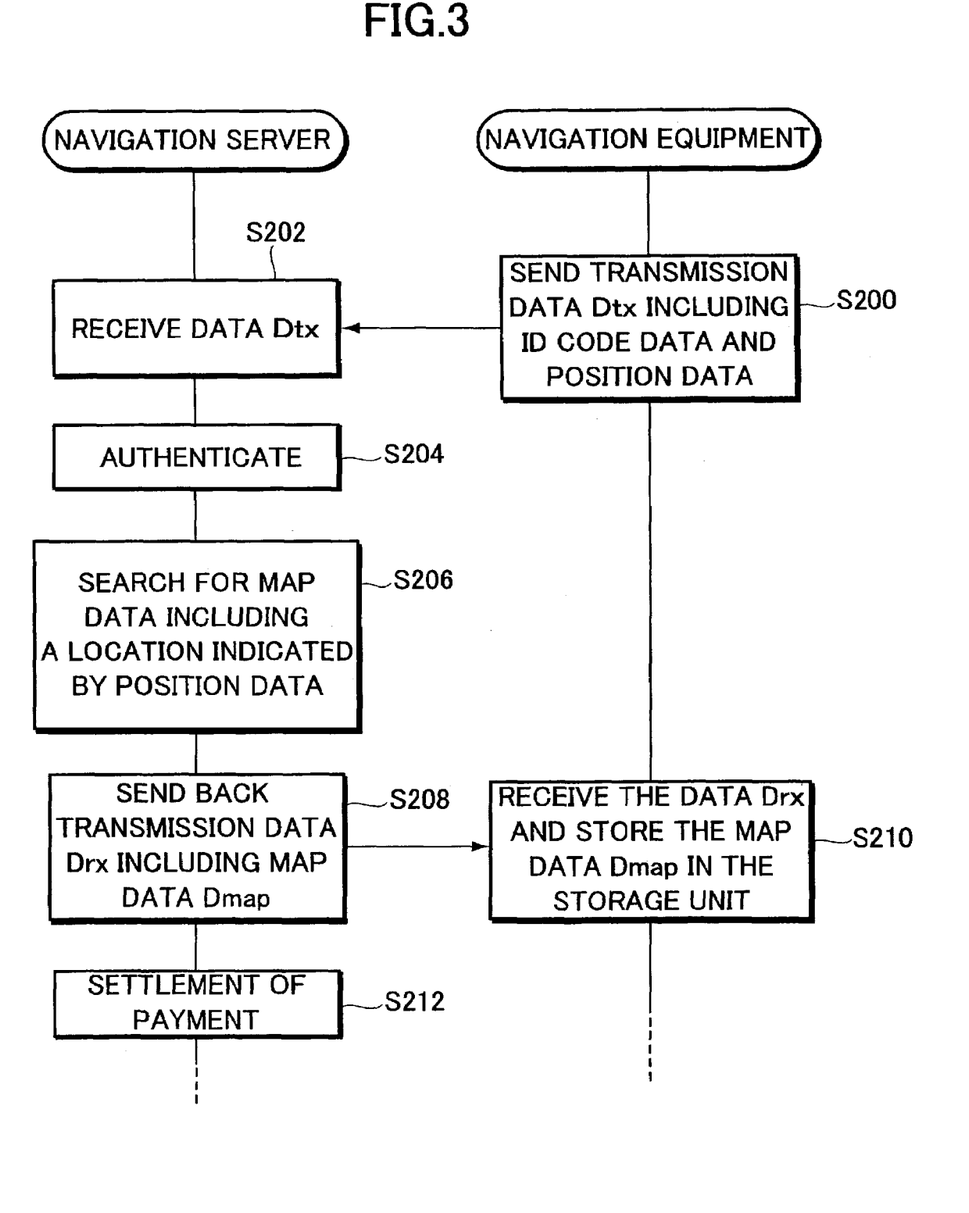
FIG. 3 is a sequence chart showing the operation for distributing map data to the navigation equipment.
Figure 4:
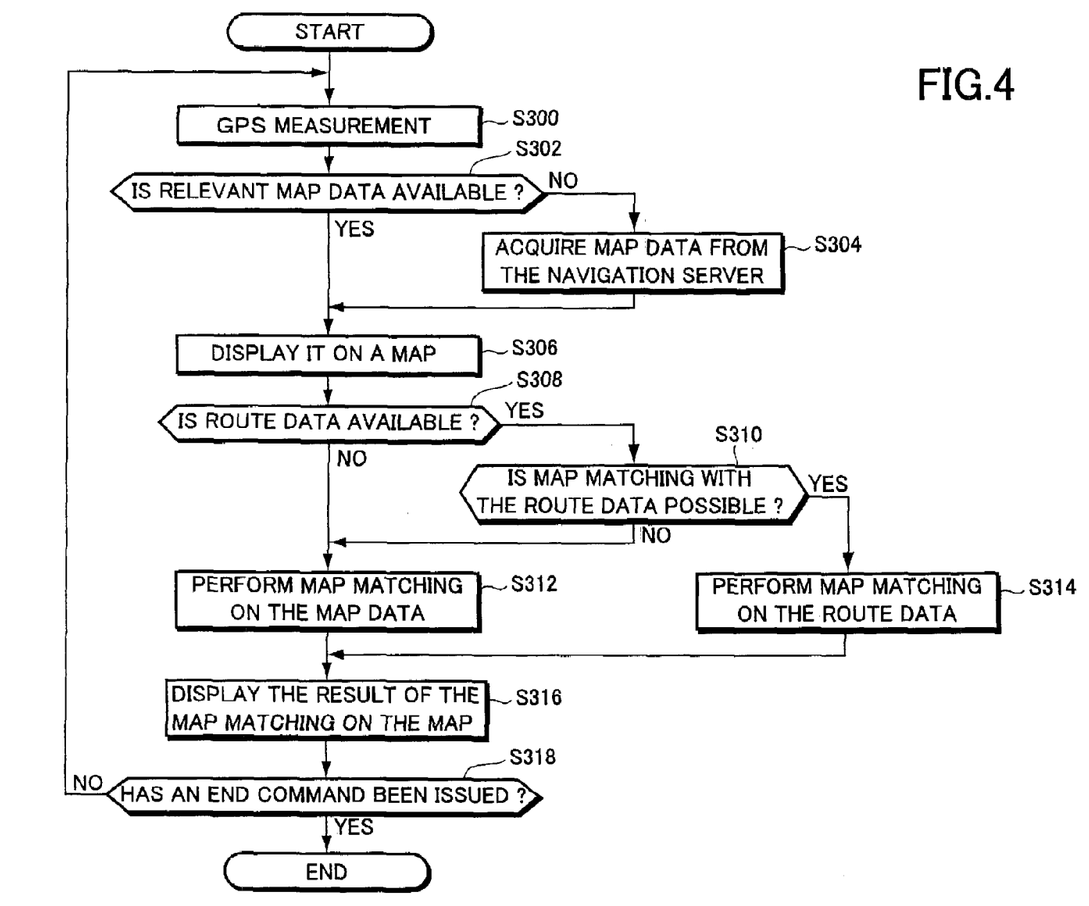
FIG. 4 is an explanatory flowchart showing a navigational operation.
Figure 5:
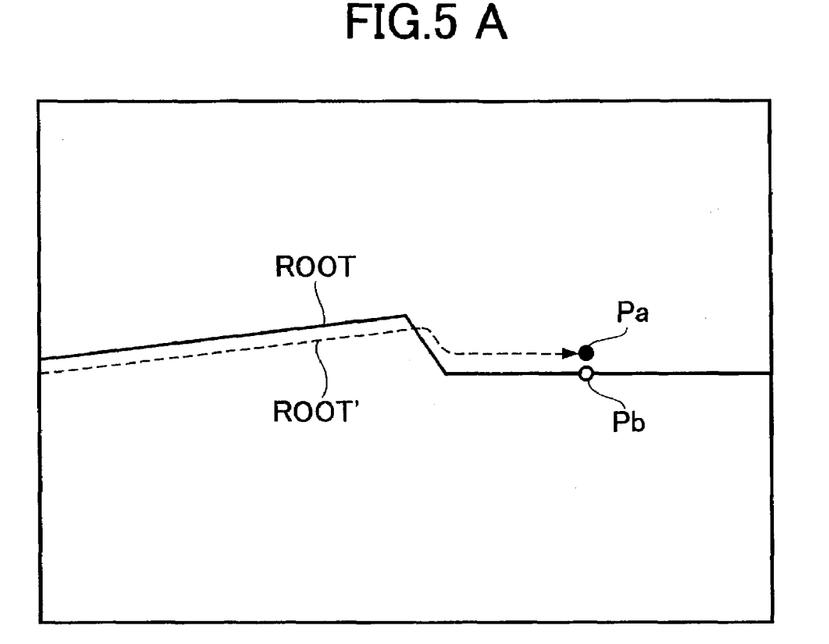
FIG. 5 provides schematic views showing the principle of map matching.

FIG. 2 is a sequence chart showing the operation for searching for an optimal route to a destination. FIG. 3 is a sequence chart showing the operation for distributing map data to the navigation equipment NAV. FIG. 4 is a flowchart showing the navigational operation for displaying the current position of a vehicle on a map. FIG. 5 is a schematic view showing the principle of map matching.

First, referring to FIG. 2, explained below is the operation for searching for a travel route to the destination.

When the user who has already signed up with the aforementioned distribution site carrier inputs his/her desired destination at the control unit 15 provided in the navigation equipment NAV and then issues a command to start searching for a travel route to the destination. This causes the control unit 15 to supply the destination data Dobj to the system controller 9. The process also starts searching for the travel route under the control of the system controller 9.

First, in step S100, the GPS receiver 10 receives radio transmissions coming from the GPS satellite 16 to determine the self-location of the vehicle, and then supplies the resulting data or the position data Dpos to the system controller 9.

Then, in step S102, the system controller 9 creates the transmission data Dtx containing the aforementioned ID code data, the position data Dpos, and the destination data Dobj, which is then supplied to the communication device 11, where the communication device 11 sends the transmission data Dtx to the navigation server 18 over the communication network 17.

After the navigation equipment NAV has sent the transmission data Dtx to the navigation server 18, the navigation server 18 receives the data Dtx in step S104, and then determines based on the ID code data contained in the data Dtx whether the access has been made by the authorized user in step S106.

Then, in step S108, the navigation server 18 searches the database according to the position data Dpos and the destination data Dobj contained in the data Dtx to determine the optimal travel route (the optimal road path) from the self-location of the user to his/her destination, then creating the detailed route data Droot indicative of only those roads included in the optimal route.

In other words, the navigation server 18 allows the route data Droot not to contain all the detailed data, such as roads or intersections present in the surrounding areas including the optimal route from the self-location of the user to his destination, but to contain detailed road data relating only to those roads included in the optimal route.

Then, in step S110, the navigation server 18 creates the transmission data Drx containing the route data Droot and then sends the resulting data back to the navigation equipment NAV.

Furthermore, the navigation server 18 charges the user for the cost of the service of sending back the route data Droot to settle the payment to the predetermined bank or the like and periodically inform the user of the resulting settlement by mail or the like (step S114).

After the transmission data Drx has been sent back to the navigation equipment NAV in step S110 as described above, in step S112, the communication device 11 provided in the navigation equipment NAV receives the data Drx, which is in turn transferred to the system controller 9, where the system controller 9 stores the route data Droot contained in the data Drx in the storage unit 13.

As described above, the position data Dpos indicative of the self-location of the vehicle and the destination data Dobj indicative of the destination are transmitted from the navigation equipment NAV to the navigation server 18. This causes the navigation server 18 to search for an optimal travel route from the self-location to the destination and then sends the resulting data or the route data Droot back to the navigation equipment NAV.

At this stage, since such information relating only to those roads included in the optimal route from the self-location to the destination is sent back as the route data Droot, it is possible to perform the transmission in a very short time. This makes it possible to provide a very fast route search function as well as significantly reduced communication costs for the user.

Referring to FIG. 3, the operation for distributing map data to the navigation equipment NAV is described below.

The process executes the procedure shown in FIG. 3 while the user who has signed up with the aforementioned distribution site carrier issues a command to start navigational guidance at the control unit 15 provided in the navigation equipment NAV and then the system controller 9 performs the navigational operation according to the command.

First, the GPS receiver 10 receives radio transmissions coming from the GPS satellite 16 according to the command from the system controller 9 to deliver the position data Dpos indicative of the self-location of the vehicle. In step S200, this causes the system controller 9 to create the transmission data Dtx containing the aforementioned ID code data and the position data Dpos, and then transmit the transmission data Dtx through the communication device 11 to the navigation server 18.

On the other hand, in step S202, the navigation server 18 receives the transmitted data Dtx, and then determines in step S204 based on the ID code data contained in the data Dtx whether the access has been made by the authorized user.

Then, in step S206, the navigation server 18 searches the database according to the position data Dpos contained in the data Dtx for the map data Dmap corresponding to a map indicative of the surrounding areas including the self-location of the user.

The map data Dmap mentioned above is formed of image data which can visually be displayed in the same manner as maps of sheet type found in a so-called commercially available atlas. The map data Dmap includes a minimal amount of road identification data which enables those roads indicated by line segments on a map to be identified as roads upon creating the image data by digitization.

Accordingly, the map data Dmap is formed of a very small quantity of data unlike the road data containing a large quantity of detailed data with regard to the orientation and distance of roads and the locations (latitudes and longitudes) and shapes of all intersections (e.g., the shapes of intersections with traffic signals or grade separated crossings).

Then, in step S208, the navigation server 18 creates the transmission data Drx containing the searched map data Dmap, which is in turn sent back to the navigation equipment NAV.

Furthermore, the navigation server 18 charges the user for the cost of the service of sending back the map data Dmap to settle the payment to the predetermined bank or the like and periodically inform the user of the resulting settlement by mail or the like (step S212).

After the transmission data Drx has been sent back to the navigation equipment NAV in step S208 as described above, in step S210, the communication device 11 provided in the navigation equipment NAV receives the data Drx, which is in turn transferred to the system controller 9, where the system controller 9 stores the map data Dmap contained in the data Drx in the storage unit 13.

As described above, the position data Dpos indicative of the self-location of the vehicle is transmitted from the navigation equipment NAV to the navigation server 18. This causes the navigation server 18 to search for the map data Dmap indicative of the surrounding areas including the self-location indicated by the position data Dpos and then send the searched map data Dmap back to the navigation equipment NAV.

At this stage, since only the map data Dmap is sent back, it is possible to perform the transmission in a very short time. This makes it possible to provide a very fast route searching function as well as significantly reduced communication costs for the user.

Now, referring to FIG. 4, the navigational operation will be explained in more detail below.

In FIG. 4, when the user issues a command to start the navigational operation at the control unit 15, the system controller 9 receives the command to initiate the navigational operation.

First, in step S300, the system controller 9 causes the GPS receiver 10 to receive radio transmissions coming from the GPS satellite 16 and determine the self-location of the vehicle to output the position data Dpos.

Then, in step S302, the system controller 9 searches the storage unit 13 according to the position data Dpos delivered from the GPS receiver 10 to determine whether the map data indicative of the surrounding areas including the self-location indicated by the position data Dpos has already been stored.

If it is determined in this step that the aforementioned map data indicative of the surrounding areas has already been stored, the process proceeds to step S306, where the map data is stored in the video memory (VRAM) of the display unit 14, thereby allowing the map indicative of the surrounding areas including the self-location to be displayed in the form of an image.

On the other hand, if it is determined that the aforementioned map data indicative of the surrounding areas has not been stored yet in the storage unit 13, the process proceeds to step S304 to perform the map search procedure, described with reference to FIG. 3, and then proceeds to step S306.

That is, in step S304, the position data Dpos determined by the GPS receiver 10 in step S300 is transmitted to the navigation server 18, and the map data Dmap indicative of the surrounding areas including the self-location, which is sent back from the navigation server 18 in response to the transmission, is received and stored in the storage unit 13.

Then, in step S306, the map data Dmap stored in the storage unit 13 is in turn stored in the video memory (VRAM) of the display unit 14, thereby allowing the map indicative of the surrounding areas including the current position to be displayed in the form of an image.

Then, in step S308, the system controller 9 determines whether the route data Droot has already been stored in the storage unit 13. That is, if the route search has already been carried out as described with reference to FIG. 2 to store the route data Droot in the storage unit 13, the system controller 9 can determine it by checking for the presence of the route data Droot whether the route data Droot has already been stored.

If it is determined in this step that the route data Droot has been stored, the process proceeds to step S310, whereas the process proceeds to step S312 if it is determined that the route data Droot has not been stored.

In step S310, it is determined whether map matching can be performed on the route data Droot. If yes, the process proceeds to step S314 to carry out the map matching and then to the step S316. If no, the process proceeds to step S312 without performing the procedure of step S314.

The aforementioned determination in step S310 is made as follows.

As schematically shown in FIG. 5A, assume that the line segments ROOT shown by the solid lines in the drawing is the optimal route to the destination in accordance with the route data Droot, and the line segments ROOT' shown by the dotted lines in the drawing is the track of the self-locations of the vehicle indicated by the position data Dpos which has been determined by the GPS receiver 10 during the travel of the vehicle until then. In this case, the distance between the self-location Pa at the coordinates (latitude and longitude) shown by the immediate position data Dpos determined in step S300 as described above and each position at the coordinates (latitude and longitude) on the line segments ROOT is calculated algebraically. It is then determined that the map matching cannot be performed if the shortest distance obtained by the calculation is greater than a predetermined distance (threshold) whereas the map matching can be performed if the shortest distance is less than the predetermined distance (threshold).

When the user has not traveled along the optimal route to the destination obtained by the route search but along a road other than the optimal route, the conditions inevitable for map matching are determined not to be satisfied, and thus a determination is made in accordance with the actual travel position.

Furthermore, the system controller 9 calculates the angle of inclination of a line segment having the predetermined distance which is oriented to the destination from the coordinates (latitude and longitude) of the line segment ROOT given when the aforementioned shortest distance is obtained. Suppose that after the process acquires the directional data Ddir which is delivered by the directional sensor 12 and indicative of the direction of travel of the vehicle, the difference between the directional angle indicated by the directional data Ddir and the angle of inclination of the aforementioned line segment is found to be greater than the predetermined angle. In this case, the vehicle is determined not to be directed along the optimal route, and the conditions inevitable for map matching are determined not to be satisfied.

Accordingly, even with the aforementioned shortest distance being less than the predetermined distance (threshold), it is determined that the map matching cannot be performed and a determination is made in accordance with the actual travel position when the vehicle is not directed along the optimal route, for example, when the vehicle is traveling along a road which is not on the optimal route.

The process proceeds to step S314 after the determination conditions in step S310 have been satisfied, and the map matching is performed in step S314.

That is, in step S314, the system controller 9 calculates algebraically the distance between the immediate self-location Pa at the coordinates (latitude and longitude) shown in FIG. 5A and each position at the coordinates (latitude and longitude) on the line segments ROOT as the optimal route, and then estimates that the coordinates on the line segments ROOT which provide the shortest distance are the true current position Pc.

Assume that the coordinates of the immediate self-location Pa are represented by (x1, y1) and the coordinates indicative of each position of the line segments ROOT on the optimal route are represented by (x, y). In this embodiment, the true current position Pc is estimated to be the coordinates (x, y) given when the calculation of $(x1-x)^2 + (y1-y)^2$ provides a minimal value. Such a simple calculation makes it possible to perform a high-speed map matching.

Then, if it has been determined in step S310 that map matching cannot be performed on the route data Droot and the process proceeds to step S312, the map matching is performed using the map data Dmap instead of the route data Droot.

That is, in step S312, the system controller 9 performs map matching between the map data Dmap stored in the storage unit 13 and the position data Dpos.

As described above, the map data Dmap includes a minimal amount of road identification data for identifying line segments as being roads, and the system controller 9 performs map matching by determining in accordance with the road identification data whether the line segment data included in the map data Dmap is indicative of roads.

Describing in more detail with reference to the schematic view of FIG. 5B, the system controller 9 determines in accordance with the road identification data that the line segment L located at the shortest distance from the self-location Pa indicated by the position data Dpos is indicative of a road. The process determines the shortest distance through the same algebraic calculation as described above.

The process then estimates the position at the shortest distance on the line segment L from the self-location Pa as the true current position Pc'.

The map matching is performed with the map data Dmap as described above. Although it is uncertain whether the road represented by the line segment L in FIG. 5B is included in the line segments ROOT of FIG. 5A (i.e., in the route data Droot), this makes it possible to perform map matching in keeping with actual service because of the estimation of the road along which the vehicle is actually traveling.

Furthermore, it is also made possible to provide a high-speed map matching upon performing the map matching using the map data Dmap because the true current position Pc' is estimated through a simplified algebraic calculation.

Subsequently, after the map matching procedure has been completed in step S312 or S314 as described above, the process proceeds to step S316, where the current position of the vehicle is displayed on the display unit 14.

That is, in step S316, the system controller 9 causes the coordinate data of the current position Pc or Pc' calculated in step S312 or S314 to be stored in the storage unit 13 and in the video memory (VRAM) of the display unit 14. This allows the coordinate data of the current position Pc or Pc' to be displayed on top of the map appearing in the form of an image, thereby presenting the current position of the vehicle on the display unit 14.

In this embodiment, a picture representative of the vehicle is displayed at the coordinates corresponding to the current position Pc or Pc', thereby providing an enhanced visual effect.

Then, in step S318, it is determined whether the user has issued a command to end the navigational operation. If no command has been issued, the process returns to step S300 to repeat the procedure whereas if the command has been issued, the process ends the series of navigational operations.

The procedure repeated in step S300 causes a new current position Pc or Pc' to be estimated each time the vehicle travels, allowing the current position Pc or Pc' to be displayed one by one on the map appearing in the form of an image on the display unit 14. Furthermore, when the current position of the vehicle disappears from the map displayed in the form of an image on the display unit 14, through the procedures in step S302 and S304, the process acquires new map data Dmap from the navigation server 18 and then displays a new map including the current position of the vehicle in the form of an image. This makes it possible to display maps having continuity.

As described above, this embodiment utilizes the map data Dmap having a small amount of information to determine the current position of a vehicle (mobile unit) by map matching. This makes it possible to significantly reduce the transmission time for transmitting the map data Dmap from the navigation server 18 to the navigation equipment NAV. Accordingly, the present invention provides advantageous effects of being able to provide a very fast navigation procedure as well as significantly reduced communication costs for the user.

Furthermore, a route search for the optimal travel route to the destination desired by the user provides a higher possibility of performing map matching with the route data Droot created in accordance with detailed road data. This allows the current position of the vehicle to be estimated with substantially the same accuracy as the map matching is performed based on a large quantity of detailed road data, thereby making it possible to display the current position of the vehicle with high accuracy on a map.

On the other hand, the navigation server 18 performs a route search for the optimal travel route to a destination in response to a request from the navigation equipment NAV and then sends the route data Droot back to the navigation equipment NAV. The time required for this procedure is comparatively longer than the time required to send back the map data Dmap. However, there is a relatively lower possibility of performing the route search and the time for the route search occupies only a smaller fraction in the time for the entire navigational operation. This makes it possible to provide a substantially fast navigational operation as well as significantly reduced communication costs for the user.

In particular, as described above, the route data Droot is formed of road data indicative of only those roads associated with the optimal travel route. This makes it possible to reduce the time required for communication, thereby contributing to a fast navigational operation and significant decreases in communication costs of the user.

In this embodiment, the GPS receiver 10 receives radio transmissions coming from the GPS satellite 16 to determine the self-location of the vehicle; however, the positioning means is not limited to the GPS receiver 10. The navigation equipment may include a directional sensor for measuring the direction of travel of the vehicle, a speed sensor for measuring speeds, and a distance sensor for measuring the distance of travel. These sensors may be used to provide measurements which are then operated to determine the self-location.

The present invention has been described in accordance with vehicle navigation equipment NAV mounted in a vehicle; however, the invention is not limited to the vehicle navigation equipment. For example, the present invention can also be applied to cellular phones or other mobile units with navigational functions, in the case of which it is also possible to provide the same effects to the user as those obtained by the aforementioned vehicle navigation equipment.

As described above, the navigation system and the navigation equipment according to the present invention are adapted to perform map matching using map information to be displayed, thereby determining the current position of a mobile unit or the like. This allows a navigation server to transmit map information having a small amount of data by radio to mobile units or the like, and thus reduces the time required for transmissions, thereby making it possible to provide high-speed navigational guidance and reduced communication cost for the user.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A navigation system including a mobile unit and a navigation server communicating with each other over a radio communication network, wherein said mobile unit comprises:

a communicating unit for communicating bi-directionally with said navigation server over said radio communication network;

a positioning unit for determining a self-location of the mobile unit;

a control unit for transmitting position information delivered by said positioning unit to said navigation server through said communicating unit, and for acquiring, from said communicating unit, map information for display indicative of a map of a surrounding area including the self-location provided by said position information sent back from said navigation server, to perform map matching between road information included in said acquired map information for display and position information determined by said positioning unit, thereby determining a current position of the mobile unit on a road; and a display unit for displaying a map in the form of an image in accordance with said map information for display and for displaying said current position determined by said control unit on said map displayed in the form of an image, wherein, when having received said position information transmitted from said mobile unit, said navigation server sends map information for display, corresponding to the map of the surrounding area including the self-location of said mobile unit determined by said received position information, back to said mobile unit, wherein said navigation server uses road information to produce optimum route information, and wherein the road information included in the map information for display is formed by data having a smaller capacity than the road information which is for use in producing the optimum route information by the navigation server.

2. The navigation system according to claim 1, wherein, when having received the position information indicative of the self-location transmitted from said mobile unit and information with regard to a destination, said navigation server searches for an optimal route from the self-location to said destination and sends route information formed of only road information with regard to a road including said optimal route back to said mobile unit, and wherein, instead of performing map matching between the road information included in said map information for display and position information determined by said positioning unit, said control unit performs map matching between the route information sent back from said navigation server and the position information determined by said positioning unit, thereby determining a current position to be displayed on said display unit.

3. The navigation system according to claim 2, wherein, when having determined that the route information sent back from said navigation server and the position information determined by said positioning unit do not satisfy a predetermined condition, said control unit performs map matching between the road information included in said map information for display and the position information determined by said positioning unit, thereby determining a current position to be displayed on said display unit.

4. Navigation equipment comprising:
a communicating unit for communicating bi-directionally with a navigation server over a radio communication network;
a positioning unit for determining a self-location;
a control unit for transmitting position information delivered by said positioning unit to said navigation server through said communicating unit, and for acquiring, from said communicating unit, map information for display indicative of a map of a surrounding area including the self-location provided by said position information sent back from said navigation server, to perform map matching between road information included in said acquired map information for display and the position information determined by said positioning unit, thereby determining a current position of a mobile unit on a road; and a display unit for displaying a map in the form of an image in accordance with said map information for display and for displaying said current position determined by said control unit on said map displayed in the form of an image, wherein said control unit transmits the position information delivered by said positioning unit and information with regard to a destination to said navigation server, and acquires route information indicative of an optimal route and formed of only road information with regard to a road to said destination from the self-location provided by the position information sent back from said navigation server, to perform map matching between the route information sent back from said navigation server and the position information determined by said positioning unit, instead of performing map matching between the road information included in said map information for display and the position information determined by said positioning unit, thereby determining a current position to be displayed on said display unit.

5. The navigation equipment according to claim 4, wherein, when having determined that the route information sent back from said navigation server and the position information determined by said positioning unit do not satisfy a predetermined condition, said control unit performs map matching between the road information included in said map information for display and the position information determined by said positioning unit, thereby determining a current position to be displayed on said display unit.

6. A navigation system, comprising:
a mobile unit capable of communicating with a navigation server over a radio communication network,
wherein said mobile unit comprises:
a communication device that communicates bi-directionally with said navigation server over said radio communication network;
a positioning device that determines a self-location of the mobile unit;
a controller that transmits position information determined by said positioning device to said navigation server through said communication device, and that receives map information from said navigation server through said communication device,
wherein said map information represents a map of a surrounding area including said self-location,
wherein said controller performs map matching between road information included in said map information and said position information determined by said positioning device to determine a current position of said mobile unit on a road represented by said road information,
wherein said navigation server uses road information to produce optimum route information, and
wherein the road information included in the map information for display is formed by data having a smaller capacity than the road information which is for use in producing the optimum route information by the navigation server.

7. The navigation system according to claim 6, further comprising:

a display device that displays an image of a map based on said map information and that displays said current position determined by said controller on said image of said map.

8. The navigation system according to claim 6, wherein said navigation server transmits said map information to said controller through said communication device.

9. A method of navigating a vehicle with a navigation system, the method comprising:
   determining a self-location of the vehicle;
   sending first transmission data to a navigation server over a communication network;
   receiving second transmission data from said navigation server over said communication network,
   wherein said second transmission data includes map data including a predetermined minimal amount of data for displaying line segments, which represent roads, on a displaying device,
   wherein said navigation server uses road information to produce optimum route information, and
   wherein said map data includes road information which is formed by data having a smaller capacity than another road information which is for use in producing the optimum route information by the navigation server.

10. The method of claim 9, wherein said first transmission data comprises position data and destination data.

11. The method of claim 9, wherein said first transmission data further comprises identification code data.

12. The method of claim 9, wherein said first transmission data comprises identification code data and position data.

13. The method of claim 9, wherein said second transmission data includes map data representing a predetermined minimal amount of data for displaying line segments, which represent only roads included in an optimal route determined by said navigation server, on a displaying device.

* * * * *